US010607426B2

(12) United States Patent
Frewen et al.

(10) Patent No.: US 10,607,426 B2
(45) Date of Patent: Mar. 31, 2020

(54) AIRCRAFT FLEET AND ENGINE SERVICE POLICY CONFIGURATION

(71) Applicant: UNITED TECHNOLOGIES CORPORATION, Farmington, CT (US)

(72) Inventors: Thomas A. Frewen, West Hartford, CT (US); Hala Mostafa, Newington, CT (US); Ozgur Erdinc, Mansfield, CT (US); Draguna Vrabie, Richland, WA (US); Mei Chen, Fuzhou (CN)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 234 days.

(21) Appl. No.: 15/790,388

(22) Filed: Oct. 23, 2017

(65) Prior Publication Data

US 2019/0088047 A1 Mar. 21, 2019

Related U.S. Application Data

(60) Provisional application No. 62/560,293, filed on Sep. 19, 2017.

(51) Int. Cl.
  *G07C 5/08* (2006.01)
  *B64D 45/00* (2006.01)
  *G06Q 10/00* (2012.01)
(52) U.S. Cl.
  CPC .......... *G07C 5/0816* (2013.01); *B64D 45/00* (2013.01); *G06Q 10/20* (2013.01); *G07C 5/0841* (2013.01)

(58) Field of Classification Search
  None
  See application file for complete search history.

(56) References Cited

U.S. PATENT DOCUMENTS

| 7,640,145 | B2 | 12/2009 | Wegerich et al. |
| 8,340,948 | B1 | 12/2012 | Song et al. |
| 2004/0243636 | A1 | 12/2004 | Hasiewicz et al. |
| 2007/0118502 | A1* | 5/2007 | Aragones ............... G06Q 10/06 |
| 2010/0262442 | A1 | 10/2010 | Wingenter |
| 2013/0024179 | A1* | 1/2013 | Mazzaro ................ G06Q 10/04 703/18 |

(Continued)

FOREIGN PATENT DOCUMENTS

WO 2016141138 9/2016

OTHER PUBLICATIONS

European Patent Office, European Search Report dated Nov. 19, 2018 in Application No. 18195551.9.

*Primary Examiner* — Todd M Melton
*Assistant Examiner* — Jason R Roberson
(74) *Attorney, Agent, or Firm* — Snell & Wilmer L.L.P.

(57) ABSTRACT

Systems and methods for the configuration of service policies for aircraft fleets and gas turbine engines are disclosed. One or more engine performance profiles may be generated based on historical engine performance data. The historical engine performance data may be retrieved based on one or more engine service parameters. A fleet performance profile may be generated based on the engine performance profiles. The engine service parameters may be varied to generate a configured engine performance profile. A configured fleet performance profile may be generated based on the configured engine performance profile.

12 Claims, 4 Drawing Sheets

(56) References Cited

U.S. PATENT DOCUMENTS

| | | |
|---|---|---|
| 2013/0179388 A1 | 7/2013 | Agarwal et al. |
| 2014/0365191 A1 | 12/2014 | Zyglowicz et al. |
| 2017/0017736 A1 | 1/2017 | Beale et al. |
| 2017/0193460 A1 | 7/2017 | Subramaniyan et al. |

\* cited by examiner

AIRCRAFT FLEET AND ENGINE SERVICE POLICY CONFIGURATION

CROSS REFERENCE TO RELATED APPLICATIONS

This application is a non-provisional of, claims priority to and the benefit of, U.S. Provisional Patent Application Ser. No. 62/560,293 filed on Sep. 19, 2017 and entitled "AIRCRAFT FLEET AND ENGINE SERVICE POLICY CONFIGURATION", which is hereby incorporated by reference in its entirety.

FIELD

The present disclosure relates to aircraft fleets and gas turbine engines, and more specifically, to the configuration of service policies for aircraft fleets and gas turbine engines.

BACKGROUND

Service policies and/or maintenance policies may be developed for gas turbine engines, aircraft (having one or more gas turbine engines), and/or aircraft fleets (having two or more aircraft with various gas turbine engines).

SUMMARY

In various embodiments, a method is disclosed. The method may comprise the steps of generating, by a processor, a plurality of engine performance profiles, wherein the engine performance profiles are based on historical engine performance data; generating, by the processor, a fleet performance profile, wherein the fleet performance profile is based on the engine performance profiles; varying, by the processor, an engine service parameter to form a configured engine performance profile; and generating, by the processor, a configured fleet performance profile based on the configured engine performance profile.

In various embodiments, the method may further comprise the steps of: receiving, by the processor, a service customization request, wherein the service customization request comprises an engine mission profile and an engine service policy, and wherein the engine service policy includes the engine service parameter; and retrieving, by the processor, historical engine performance data based on at least one of the engine mission profile or the engine service policy. The step of varying the engine service parameter may further comprise: retrieving, by the processor, historical engine performance data based on the engine mission profile and the varied engine service parameter; and forming, by the processor, the configured engine performance profile based on the historical engine performance data. The engine mission profile may comprise at least one of an expected gas turbine engine use, an expected gas turbine engine flight pattern, or an expected gas turbine engine frequency of use. The engine service parameter may comprise at least one of a service frequency, a service task, or a service level. The engine mission profile may correspond to one or more gas turbine engines. In response to generating the configured fleet performance profile, a first gas turbine engine in a first aircraft may be exchanged with a second gas turbine engine in a second aircraft.

In various embodiments, a system is disclosed. The system may comprise a processor. The processor may be configured to perform operations comprising: generating, by the processor, a plurality of engine performance profiles, wherein the engine performance profiles are based on historical engine performance data; generating, by the processor, a fleet performance profile, wherein the fleet performance profile is based on the engine performance profiles; varying, by the processor, an engine service parameter to form a configured engine performance profile; and generating, by the processor, a configured fleet performance profile based on the configured engine performance profile.

In various embodiments, the operations may further comprise the steps of: receiving, by the processor, a service customization request, wherein the service customization request comprises an engine mission profile and an engine service policy, and wherein the engine service policy includes the engine service parameter; and retrieving, by the processor, historical engine performance data based on at least one of the engine mission profile or the engine service policy. The operation of varying the engine service parameter may further comprise: retrieving, by the processor, historical engine performance data based on the engine mission profile and the varied engine service parameter; and forming, by the processor, the configured engine performance profile based on the historical engine performance data. The engine mission profile may comprise at least one of an expected gas turbine engine use, an expected gas turbine engine flight pattern, or an expected gas turbine engine frequency of use. The engine service parameter may comprise at least one of a service frequency, a service task, or a service level. The engine mission profile may correspond to one or more gas turbine engines. In response to generating the configured fleet performance profile, a first gas turbine engine in a first aircraft may be exchanged with a second gas turbine engine in a second aircraft.

In various embodiments, an article of manufacture is disclosed. The article of manufacture may include a non-transitory, tangible computer readable storage medium having instructions stored thereon that, in response to execution by a computer based system, cause the computer based system to perform operations comprising: generating, by the computer based system, a plurality of engine performance profiles, wherein the engine performance profiles are based on historical engine performance data; generating, by the computer based system, a fleet performance profile, wherein the fleet performance profile is based on the engine performance profiles; varying, by the computer based system, an engine service parameter to form a configured engine performance profile; and generating, by the computer based system, a configured fleet performance profile based on the configured engine performance profile.

In various embodiments, the operations may further comprise the steps of: receiving, by the computer based system, a service customization request, wherein the service customization request comprises an engine mission profile and an engine service policy, and wherein the engine service policy includes the engine service parameter; and retrieving, by the computer based system, historical engine performance data based on at least one of the engine mission profile or the engine service policy. The operation of varying the engine service parameter may further comprise: retrieving, by the computer based system, historical engine performance data based on the engine mission profile and the varied engine service parameter; and forming, by the computer based system, the configured engine performance profile based on the historical engine performance data. The engine mission profile may comprise at least one of an expected gas turbine engine use, an expected gas turbine engine flight pattern, or an expected gas turbine engine frequency of use. The engine service parameter may comprise at least one of a service frequency, a service task, or a service level. The engine mission profile may correspond to one or more gas turbine engines.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). As used herein, "transmit" may include sending data from one system component to another via electronic communication between the components. Additionally, as used herein, "data" may include encompassing information such as commands, queries, files, data for storage, and the like in digital or any other form.

Figure 1:
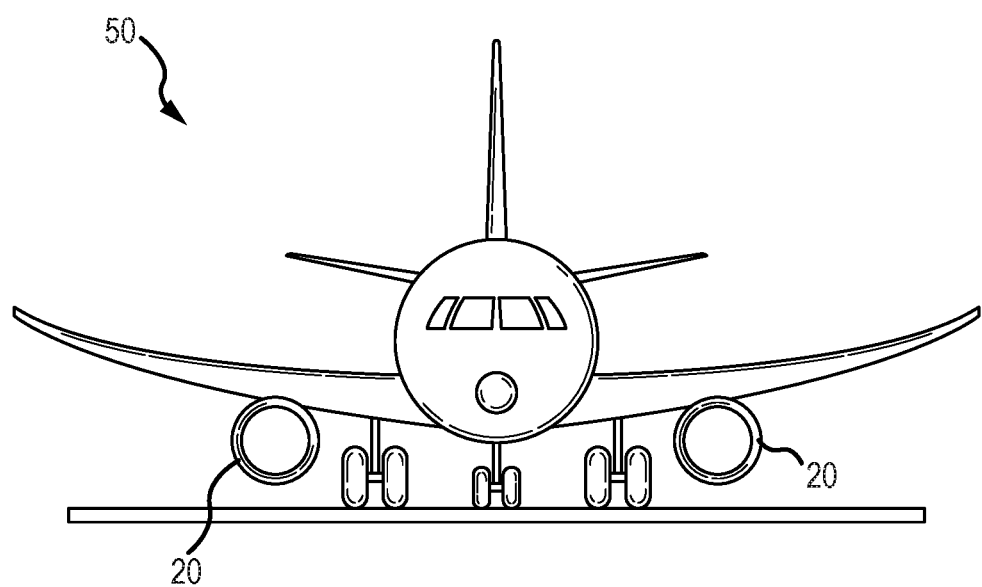
FIG. 1 illustrates a perspective view of an aircraft, in accordance with various embodiments.
Figure 2:
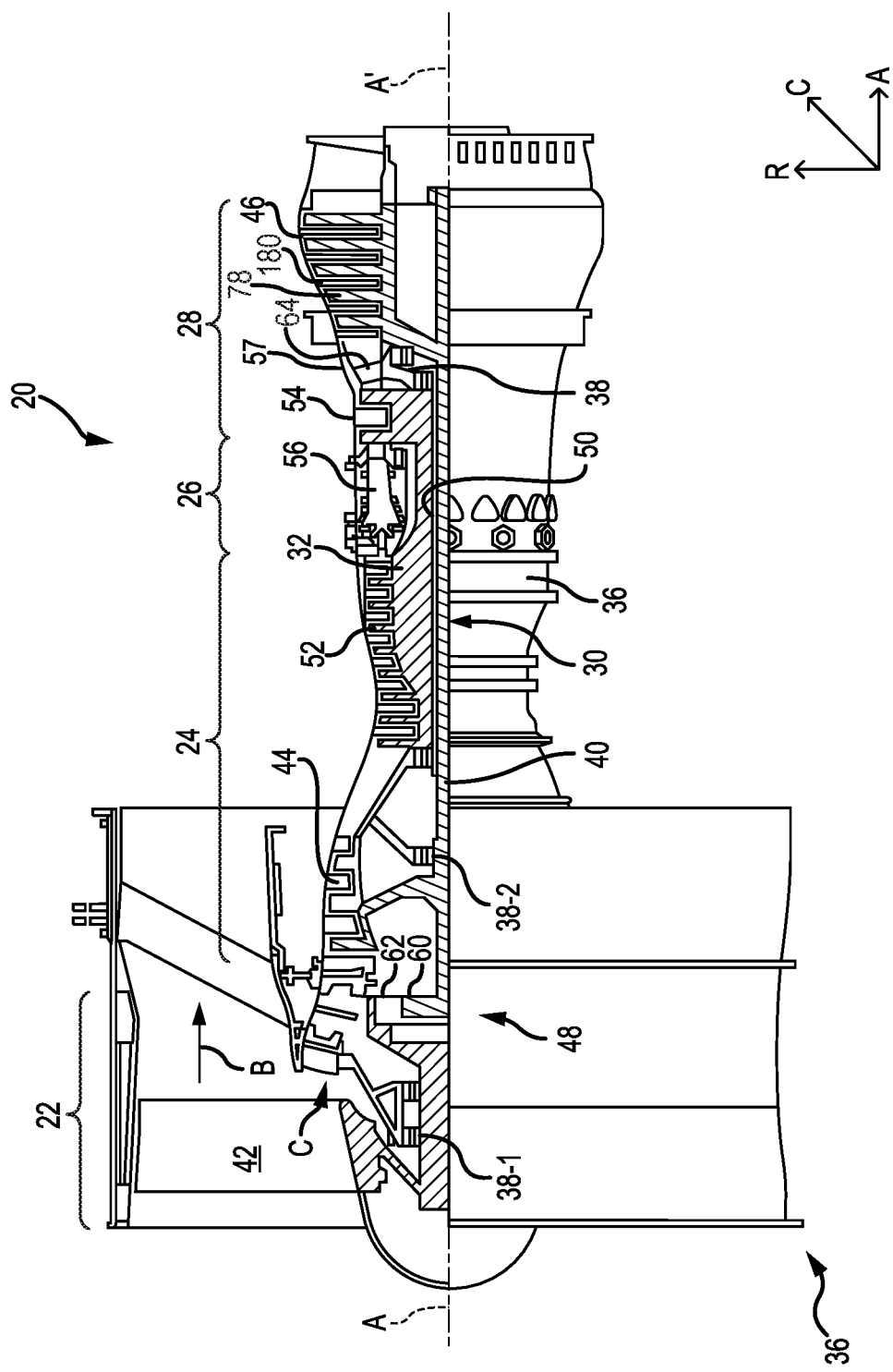
FIG. 2 illustrates a perspective view of a gas turbine engine, in accordance with various embodiments.

Aircraft, such as aircraft 10 depicted in FIG. 1, may comprise one or more gas turbine engine 20. Referring to FIG. 2, an exemplary gas turbine engine 20 (such as a turbofan gas turbine engine) is illustrated according to various embodiments. As used herein, "forward" refers to the direction associated with a nose (e.g., the front end) of the aircraft, or generally, to the direction of flight or motion. An A-R-C axis has been included throughout the figures to illustrate the axial (A), radial (R) and circumferential (C) directions. For clarity, axial axis A spans parallel to engine central longitudinal axis A-A'. As utilized herein, radially inward refers to the negative R direction towards engine central longitudinal axis A-A', and radially outward refers to the R direction away from engine central longitudinal axis A-A'.

Gas turbine engine 20 may comprise a two-spool turbofan that generally incorporates a fan section 22, a compressor section 24, a combustor section 26, and a turbine section 28. Gas turbine engine 20 may also comprise, for example, an augmenter section, and/or any other suitable system, section, or feature. In operation, fan section 22 may drive coolant (e.g., air) along a bypass flow-path B, while compressor section 24 may further drive coolant along a core flow-path C for compression and communication into combustor section 26, before expansion through turbine section 28. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 20 may comprise a low speed spool 30 and a high speed spool 32 mounted for rotation about an engine central longitudinal axis A-A' relative to an engine static structure 36 or an engine case via one or more bearing systems 38 (shown as, for example, bearing system 38-1 and bearing system 38-2 in FIG. 1). It should be understood that various bearing systems 38 at various locations may alternatively or additionally be provided, including, for example, bearing system 38, bearing system 38-1, and/or bearing system 38-2.

In various embodiments, low speed spool 30 may comprise an inner shaft 40 that interconnects a fan 42, a low pressure (or a first) compressor section 44, and a low pressure (or a second) turbine section 46. Inner shaft 40 may be connected to fan 42 through a geared architecture 48 that can drive fan 42 at a lower speed than low speed spool 30. Geared architecture 48 may comprise a gear assembly 58 enclosed within a gear housing 59. Gear assembly 58 may couple inner shaft 40 to a rotating fan structure. High speed spool 32 may comprise an outer shaft 50 that interconnects a high pressure compressor ("HPC") 52 (e.g., a second compressor section) and high pressure (or a first) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and may rotate via bearing systems 38 about engine central longitudinal axis A-A'. As used herein, a "high pressure" compressor and/or turbine may experience a higher pressure than a corresponding "low pressure" compressor and/or turbine.

In various embodiments, the coolant along core airflow C may be compressed by low pressure compressor 44 and HPC 52, mixed and burned with fuel in combustor 56, and expanded over high pressure turbine 54 and low pressure turbine 46. Mid-turbine frame 57 may comprise airfoils 64 located in core airflow path C. Low pressure turbine 46 and high pressure turbine 54 may rotationally drive low speed spool 30 and high speed spool 32, respectively, in response to the expansion.

In various embodiments, gas turbine engine 20 may be, for example, a high-bypass ratio geared engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

The next generation turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

In various embodiments, and with reference to FIGS. 1 and 2, aircraft 50 may comprise one or more gas turbine engines 20. An aircraft fleet may comprise two or more aircraft 50, with each aircraft 50 having one or more gas turbine engines 20. The creation and configuration of service policies may be desired for the aircraft fleet and individual gas turbine engines 20. The service policy for the aircraft fleet may account for and inform upon the service policies for each gas turbine engine 20, and the service policies for each gas turbine engine 20 may account for and inform upon the service policy for the aircraft fleet. For example, service policies may designate that gas turbine engines 20 may be transferred between aircraft 50 in the aircraft fleet to balance operational usage and at least partially reduce wear and tear in each gas turbine engine 20. For example, service policies may include configuration of gas turbine engine 20 delivery schedule, suggested number of spare gas turbine engines to purchase, and/or the like.

Figure 3:
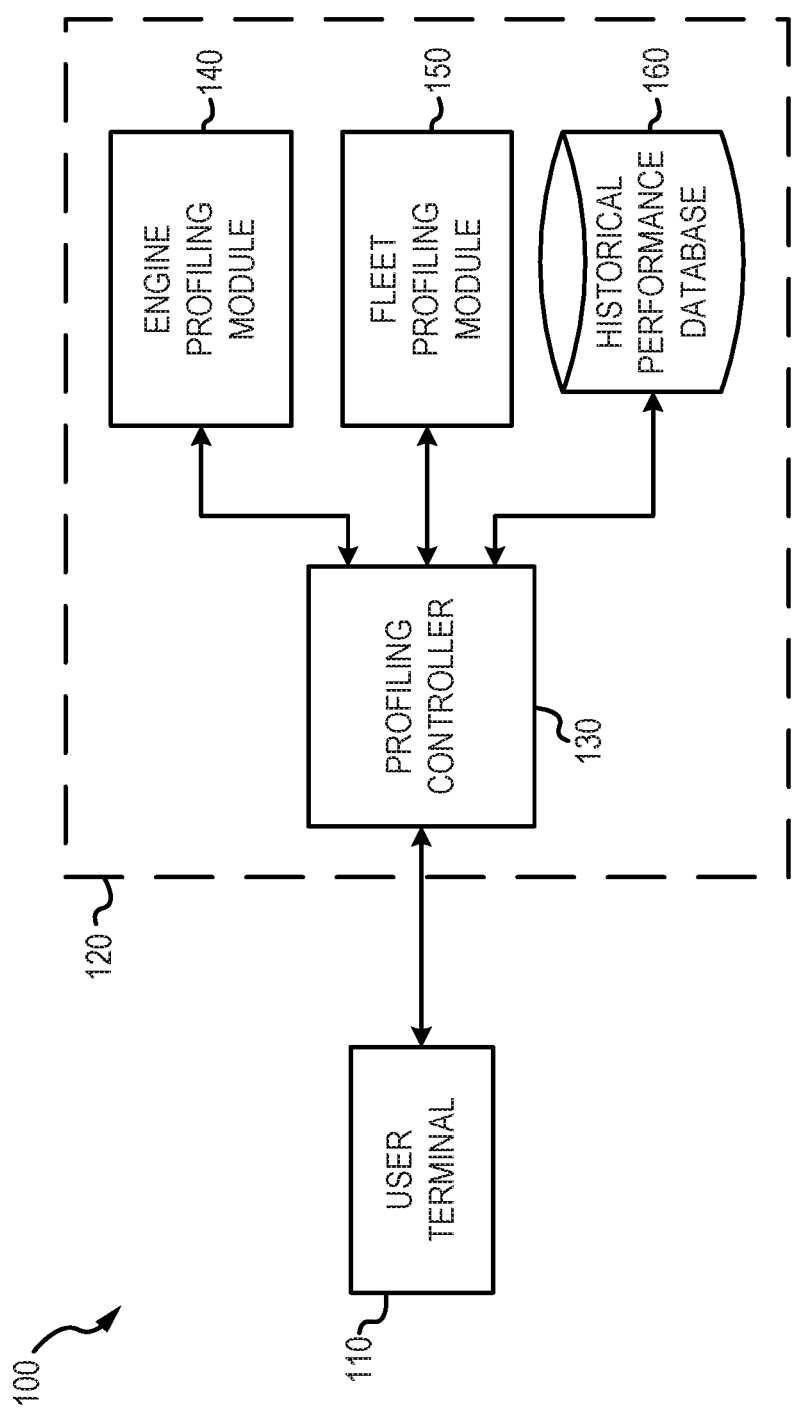
FIG. 3 illustrates a block diagram for a system of configuring service policies for aircraft fleets, in accordance with various embodiments.

In various embodiments, and with reference to FIG. 3, a system 100 for configuring service policies for aircraft fleets is provided. System 100 may comprise a user terminal 110 in electronic communication with a performance network 120. In various embodiments, user terminal 110 may also be in direct electronic communication with profiling controller 130, as discussed further herein. User terminal 110 may comprise any suitable hardware and/or software components capable of transmitting and receiving data. For example, user terminal 110 may comprise a personal computer, personal digital assistant, cellular phone, or the like. User terminal 110 may also comprise a website, application, interface, or the like capable of allowing interaction with performance network 120. As described further herein, user terminal 110 may comprise various interfaces (e.g., a display interface, a network or communications interface, etc.), memory, input devices, output devices, software (operating system, support software, drivers, etc.), and the like configured to aid in transmitting and receiving data.

In various embodiments, user terminal 110 may be configured to interact with profiling network 120 to generate and configured aircraft fleet service policies, including, for example, engine performance profiles and fleet performance profiles, as discussed further herein. In that respect, user terminal 110 may be configured to generate and transmit a service customization request and/or a configured service customization request, as discussed further herein.

In various embodiments, performance network 120 may comprise any suitable server environment or network configured to enable access from user terminal 110 to various performance network 120 components, as described further herein. For example, performance network 120 may include any cloud, cloud computing system or electronic communications system or method which incorporates hardware and/or software components. For example, performance network 120 may enable communication between system 100 components through any suitable communication channel, such as, for example, an extranet, an intranet, Internet, online communications, satellite communications, off-line communications, wireless communications, local area network (LAN), wide area network (WAN), virtual private network (VPN), networked or linked devices, keyboard, mouse and/or any suitable communication or data input modality. In various embodiments, performance network 120 may comprise a profiling controller 130, an engine profiling module 140, a fleet profiling module 150, and a historical performance database 160.

In various embodiments, each of the controllers, modules, databases, or the like in performance network 120 may be integrated into a single computer system, such as in a diagnostic and/or service computer system. In various embodiments, each of the controllers, modules, databases, or the like in performance network 120 may also comprise standalone computer systems in logical and/or electronic communication with each other via performance network 120.

In various embodiments, profiling controller 130 may be in electronic communication with engine profiling module 140, fleet profiling module 150, historical performance database 160, and/or user terminal 110. Profiling controller 130 may comprise any suitable computer system, processor, or the like capable of receiving data and performing operations. Profiling controller 130 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, profiling controller 130 may comprise a processor configured to implement various logical operations in response to execution of instructions, for example, instructions stored on a non-transitory, tangible, computer-readable medium.

Profiling controller 130 may be configured as a central hub for access to profiling network 120. For example, and as discussed further herein, profiling controller 130 may be configured to receive the service customization request and/or the configured service customization request from user terminal 110. Profiling controller 130 may also be configured to query historical performance database 160 based on the service customization request and/or the configured service customization request, and transmit data to engine profiling module 140 and/or fleet profiling module 150, as discussed further herein.

In various embodiments, engine profiling module 140 may be in electronic communication with profiling controller 130. Engine profiling module 140 may comprise any suitable computer system, processor, or the like capable of receiving data and performing operations. Engine profiling module 140 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, engine profiling module 140 may comprise a processor configured to implement various logical operations in response to execution of instructions, for example, instructions stored on a non-transitory, tangible, computer-readable medium.

Engine profiling module 140 may be configured to receive data from profiling controller 130, and generate an engine performance profile or a configured engine performance profile based on the data, as discussed further herein. Engine profiling module 140 may also be configured to transmit the engine performance profile or the configured engine performance profile to profiling controller 130.

In various embodiments, fleet profiling module 150 may be in electronic communication with profiling controller 130. Fleet profiling module 150 may comprise any suitable computer system, processor, or the like capable of receiving data and performing operations. Fleet profiling module 150 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. In various embodiments, fleet profiling module 150 may comprise a processor configured to implement various logical operations in response to execution of instructions, for example, instructions stored on a non-transitory, tangible, computer-readable medium.

Fleet profiling module 150 may be configured to receive data from profiling controller 130, and generate a fleet performance profile or a configured fleet performance profile based on the data, as discussed further herein. Fleet profiling module 150 may also be configured to transmit the fleet performance profile or the configured fleet performance profile to profiling controller 130.

In various embodiments, historical performance database 160 may be in electronic communication with profiling controller 130. Historical performance database 160 may be configured to receive, store, and maintain historical engine performance data, as discussed further herein. Historical performance database 160 may comprise any suitable data structure, such as a database (including a relational, hierarchical, graphical, blockchain, or object-oriented structure and/or any other database configurations), a flat file structure, and/or the like. In the flat file structure, data may be stored in a single file in the form of rows and columns, with no structure for indexing and no structural relationships between records. For example, a flat file structure may include a delimited text file, a CSV (comma-separated values) file, and/or any other suitable flat file structure. Historical performance database 160 may be organized in any suitable manner, for example, as data tables or lookup tables. Each record may be a single file, a series of files, a linked series of data fields or any other data structure.

Association of certain data in historical performance database 160 may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

Figure 4:
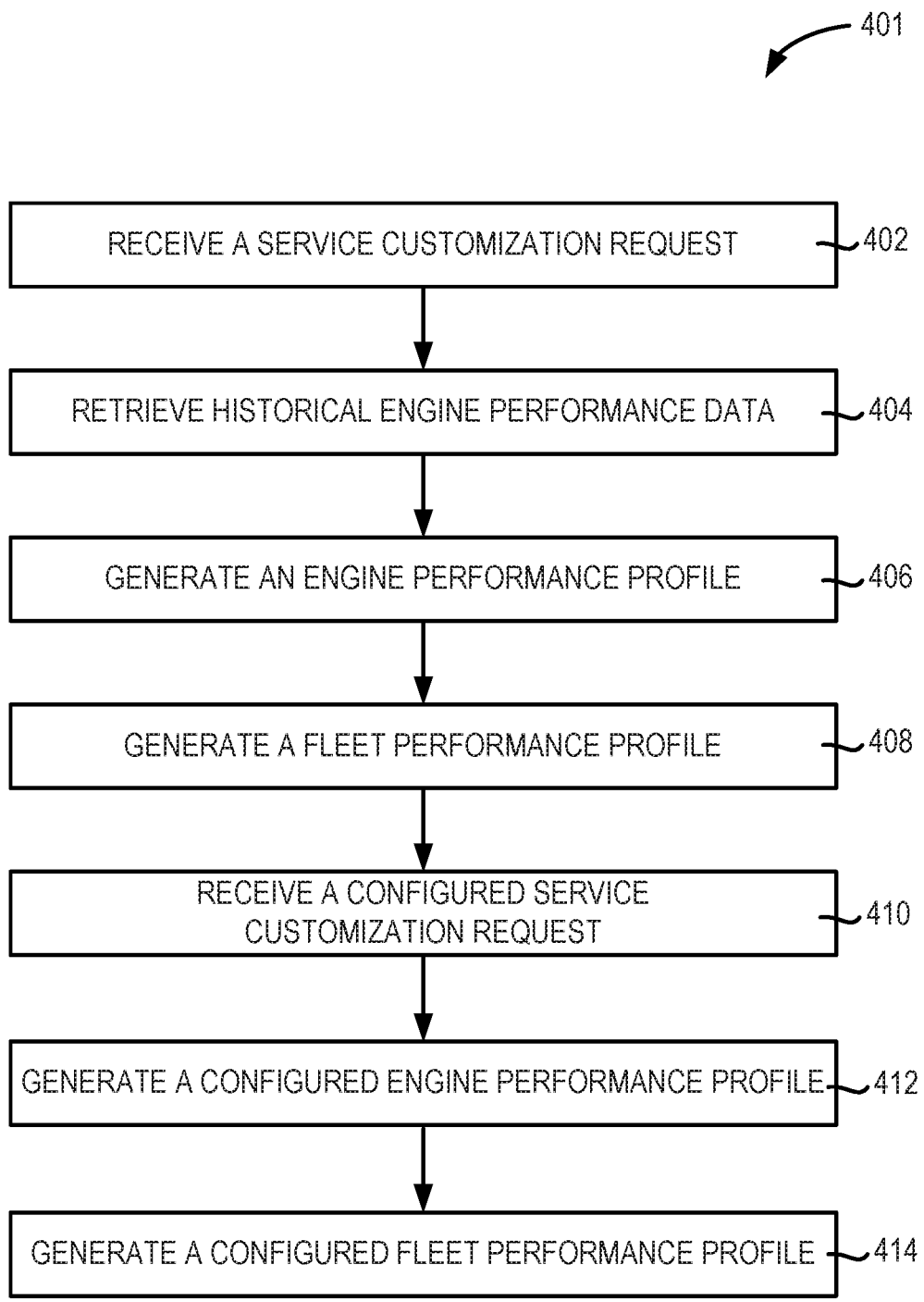
FIG. 4 illustrates a process flow for a method of configuring service policies for aircraft fleets, in accordance with various embodiments.

In various embodiments, and with reference to FIG. 4, a process flow for a method 401 of configuring service policies for aircraft fleets is disclosed. With reference to FIGS. 3 and 4, method 401 may comprise receiving a service customization request (step 402). Profiling controller 130 in profiling network 120 may be configured to receive the service customization request from user terminal 110. User terminal 110 may be configured to generate and transmit the service customization request (e.g., via user input or the like). The service customization request may comprise an engine mission profile and an engine service policy. The engine mission profile may comprise data indicating an expected usage of a gas turbine engine. For example, the engine mission profile may comprise data indicating expected flight patterns, expected frequency of use, or the like. The engine service policy may comprise data indicating expected and/or desired service and repair on the gas turbine engine. For example, the engine service policy may comprise data indicating desired or expected service or repair frequency, service or repair tasks, service or repair levels (e.g., minor service, engine overhaul, etc.), or the like.

In various embodiments, the service customization request may comprise one or more engine mission profiles. For example, the service customization request may comprise one engine mission profile for each gas turbine engine in the aircraft fleet. In various embodiments, the service customization request may comprise one engine mission profile for one or more groupings of gas turbine engines in the aircraft fleet (e.g., grouped based on expected flight patterns, expected frequency of use, etc.). In that respect, the service customization request may also comprise one or more engine service policies based on the number of engine mission profiles (e.g., one engine service policy for each engine mission profile comprised in the service customization request).

Method 401 may comprise retrieving historical engine performance data (step 404). Profiling controller 130 may be configured to retrieve the historical engine performance data from historical performance database 160. For example, profiling controller 130 may retrieve the historical engine performance data in response to receiving the service customization request. Profiling controller 130 may be configured to parse the service customization request to determine the one or more engine mission profiles and the one or more engine service policies.

Profiling controller 130 may retrieve the historical engine performance data based on the engine mission profile and the engine service policy. For example, the historical engine performance data may comprise historical data indicating an expected residual life curve for a given gas turbine engine based on a specific engine mission profile and engine service policy. In that respect, the historical engine performance data may indicate an expected lifespan and performance profile for a gas turbine engine, based on the usage of the gas turbine engine and the service policy. In various embodiments, profiling controller 130 may retrieve historical engine performance data for each engine mission profile defined in the service customization request. Profiling controller 130 may transmit the historical engine performance data to engine profiling module 140.

Method 401 may comprise generating an engine performance profile (step 406). Engine profiling module 140 may be configured to generate the engine performance profile. Engine profiling module 140 may receive the historical engine performance data from profiling controller 130. Engine profiling module 140 may generate the engine performance profile based on the historical engine performance data. In various embodiments, engine profiling module 140 may be configured to generate one or more engine performance profiles. For example, engine profiling module 140 may be configured to generate one engine performance profile for each gas turbine engine in the aircraft fleet. In various embodiments, engine profiling module 140 may also be configured to generate one engine performance profile for each engine mission profile comprised in the service customization request. Engine profiling module 140 may transmit the engine performance profile to fleet profiling module 150, via profiling controller 130.

Method 401 may comprise generating a fleet performance profile (step 408). Fleet profiling module 150 may be configured to generate the fleet performance profile. Fleet profiling module 150 may receive one or more engine performance profiles from profiling controller 130. Fleet profiling module 150 may generate the fleet performance profile based on the engine performance profiles. In that respect, the fleet performance profile may comprise data indicating a constructed picture of expected aircraft fleet health based on the engine performance profiles for each gas turbine engine in the aircraft fleet. For example, the fleet performance profile may comprise data indicating an expected number of gas turbine engine failures as a function of service time. Fleet profiling module 150 may transmit the fleet performance profile to user terminal 110, via profiling controller 130. In that respect, a user via user terminal 110 may access and view the fleet performance profile.

Method 401 may comprise receiving a configured service customization request (step 410). Profiling controller 130 may be configured to receive the configured service customization request. Profiling controller 130 may receive the configured service customization request from user terminal 110. The configured service customization request may comprise data indicating a variance to the engine mission profile (e.g., a configured engine mission profile) and/or the engine service policy (e.g., a configured engine service policy), relative to the service customization request received in step 402. For example, the engine mission profile and/or the engine service policy may be varied to effect a change in the fleet performance profile (e.g., to optimize or configure the fleet performance profile). As a further example, the repair frequency parameter in the engine service policy may be increased or decreased, the expected service level or type may be varied, or the like.

Method 401 may comprise generating a configured engine performance profile (step 412). Engine profiling module 140 may be configured to generate the configured engine performance profile. In response to receiving the configured service customization request, profiling controller 130 may parse the configured service customization request to determine the configured engine mission profile and/or configured engine service policy. Based on the configured engine mission profile and/or configured engine service policy, profiling controller 130 may retrieve historical engine performance data. Profiling controller 130 may transmit the historical engine performance data to engine profiling module 140.

Engine profiling module 140 may generate the configured engine performance profile based on the historical engine performance data. In various embodiments, engine profiling module 140 may be configured to generate one or more configured engine performance profiles. For example, engine profiling module 140 may be configured to generate one configured engine performance profile for each gas turbine engine in the aircraft fleet. In various embodiments, engine profiling module 140 may also be configured to generate one configured engine performance profile for each configured engine mission profile comprised in the configured service customization request. Engine profiling module 140 may transmit the configured engine performance profile to fleet profiling module 150, via profiling controller 130.

Method 401 may comprise generating a configured fleet performance profile (step 414). Fleet profiling module 150 may be configured to generate the configured fleet performance profile. Fleet profiling module 150 may receive one or more configured engine performance profiles from profiling controller 130. Fleet profiling module 150 may generate the configured fleet performance profile based on the configured engine performance profiles. In that respect, the configured fleet performance profile may comprise an updated fleet performance profile based on the variances in the configured service customization request. Fleet profiling module 150 may transmit the fleet performance profile to user terminal 110, via profiling controller 130. In that respect, a user via user terminal 110 may access and view the configured fleet performance profile. In various embodiments, steps 410, 412, and 414 may be repeated as desired to customize, configure, and/or optimize the fleet performance profile.

In various embodiments, in response to generating the configured fleet performance profile, gas turbine engines and/or aircraft in an aircraft fleet may be optimized and/or configured. For example, based on the configured fleet performance profile, gas turbine engines may be exchanged between aircraft in the aircraft fleet. For example, a first gas turbine engine in a first aircraft may be exchanged with a second gas turbine engine in a second aircraft. In that respect, usage of gas turbine engines in the aircraft fleet may be configured based on the configured fleet performance profile.

As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. As those skilled in the art will appreciate, user terminal 110, with brief reference to FIG. 3, may include an operating system (e.g., WINDOWS®, OS2, UNIX®, LINUX®, SOLARIS®, MacOS, etc.) as well as various conventional support software and drivers typically associated with computers.

The computer systems described herein may include one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
receiving, by a processor, a service customization request, wherein the service customization request comprises an engine mission profile and an engine service policy, wherein the engine service policy includes an engine service parameter, and wherein the engine service parameter comprises at least one of a service frequency, a service task, or a service level;
retrieving, by the processor, historical engine performance data comprising an expected residual life curve based on at least one of the engine mission profile or the engine service policy;
generating, by the processor, a plurality of engine performance profiles, wherein the engine performance profiles are based on the historical engine performance data;
generating, by the processor, a fleet performance profile, wherein the fleet performance profile comprises a constructed picture of expected aircraft fleet health comprising data indicating a number of expected gas turbine engine failures as a function of service time and is based on the engine performance profiles;
varying, by the processor, the engine service parameter to form a configured engine performance profile;

generating, by the processor, a configured fleet performance profile based on the configured engine performance profile, and
wherein in response to generating the configured fleet performance profile, a first gas turbine engine in a first aircraft is exchanged with a second gas turbine engine in a second aircraft.

2. The method of claim 1, wherein varying the engine service parameter further comprises:
retrieving, by the processor, the historical engine performance data based on the engine mission profile and the varied engine service parameter; and
forming, by the processor, the configured engine performance profile based on the historical engine performance data.

3. The method of claim 1, wherein the engine mission profile comprises at least one of an expected gas turbine engine use, an expected gas turbine engine flight pattern, or an expected gas turbine engine frequency of use.

4. The method of claim 1, wherein the engine mission profile corresponds to one or more gas turbine engines.

5. A system comprising:
a processor,
the processor configured to perform operations comprising:
receiving, by the processor, a service customization request, wherein the service customization request comprises an engine mission profile and an engine service policy, wherein the engine service policy includes an engine service parameter, and wherein the engine service parameter comprises at least one of a service frequency, a service task, or a service level;
retrieving, by the processor, historical engine performance data comprising an expected residual life curve based on at least one of the engine mission profile or the engine service policy;
generating, by the processor, a plurality of engine performance profiles, wherein the engine performance profiles are based on the historical engine performance data;
generating, by the processor, a fleet performance profile, wherein the fleet performance profile comprises a constructed picture of expected aircraft fleet health comprising data indicating a number of expected gas turbine engine failures as a function of service time and is based on the engine performance profiles;
varying, by the processor, the engine service parameter to form a configured engine performance profile; and
generating, by the processor, a configured fleet performance profile based on the configured engine performance profile, wherein in response to generating the configured fleet performance profile, a first gas turbine engine in a first aircraft is exchanged with a second gas turbine engine in a second aircraft.

6. The system of claim 5, wherein the operations of varying the engine service parameter further comprises:
retrieving, by the processor, the historical engine performance data based on the engine mission profile and the varied engine service parameter; and
forming, by the processor, the configured engine performance profile based on the historical engine performance data.

7. The system of claim 5, wherein the engine mission profile comprises at least one of an expected gas turbine engine use, an expected gas turbine engine flight pattern, or an expected gas turbine engine frequency of use.

8. The system of claim 5, wherein the engine mission profile corresponds to one or more gas turbine engines.

9. An article of manufacture including a non-transitory, tangible computer readable storage medium having instructions stored thereon that, in response to execution by a computer based system, cause the computer based system to perform operations comprising:
receiving, by the computer based system, a service customization request, wherein the service customization request comprises an engine mission profile and an engine service policy, wherein the engine service policy includes an engine service parameter, and wherein the engine service parameter comprises at least one of a service frequency, a service task, or a service level;
retrieving, by the computer based system, historical engine performance data comprising an expected residual life curve based on at least one of the engine mission profile or the engine service policy;
generating, by the computer based system, a plurality of engine performance profiles, wherein the engine performance profiles are based on the historical engine performance data;
generating, by the computer based system, a fleet performance profile, wherein the fleet performance profile comprises a constructed picture of expected aircraft fleet health comprising data indicating a number of expected gas turbine engine failures as a function of service time and is based on the engine performance profiles;
varying, by the computer based system, the engine service parameter to form a configured engine performance profile; and
generating, by the computer based system, a configured fleet performance profile based on the configured engine performance profile, wherein in response to generating the configured fleet performance profile, a first gas turbine engine in a first aircraft is exchanged with a second gas turbine engine in a second aircraft.

10. The article of manufacture of claim 9, wherein the operations of varying the engine service parameter further comprises:
retrieving, by the computer based system, the historical engine performance data based on the engine mission profile and the varied engine service parameter; and
forming, by the computer based system, the configured engine performance profile based on the historical engine performance data.

11. The article of manufacture of claim 9, wherein the engine mission profile comprises at least one of an expected gas turbine engine use, an expected gas turbine engine flight pattern, or an expected gas turbine engine frequency of use.

12. The article of manufacture of claim 9, wherein the engine mission profile corresponds to one or more gas turbine engines.

* * * * *